United States Patent
Messner et al.

(10) Patent No.: US 6,201,093 B1
(45) Date of Patent: Mar. 13, 2001

(54) AMINO-FUNCTIONAL POLYORGANOSILOXANES, THEIR PRODUCTION AND USE

(75) Inventors: Michael Messner, Diedorf; Holger Rautschek, Nünchritz, both of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/233,201

(22) Filed: Jan. 20, 1999

(30) Foreign Application Priority Data

Jan. 21, 1998 (DE) ............................................. 198 02 069

(51) Int. Cl.[7] .......................... C08G 77/26; C08G 77/06; D06M 15/19; D06M 15/643

(52) U.S. Cl. .................................. 528/28; 528/12; 528/20; 528/21; 528/24; 528/26; 528/27; 528/30; 528/33; 528/38; 524/838; 524/860; 252/8.61; 252/8.63; 8/115.58; 8/115.59; 8/115.63; 8/115.64; 8/115.66

(58) Field of Search ................................... 528/12, 20, 21, 528/24, 26, 27, 28, 30, 33, 38; 524/189, 190, 287, 334, 588, 755, 838, 860; 252/8.63, 8.61; 8/115.58, 115.59, 115.64, 115.66, 115.63

(56) References Cited

U.S. PATENT DOCUMENTS

| | | |
|---|---|---|
| 4,071,577 | 1/1978 | Falender et al. . |
| 4,098,701 | 7/1978 | Burrill et al. . |
| 4,985,155 | 1/1991 | Yamada et al. . |
| 5,468,477 * | 11/1995 | Kumar et al. ..................... 424/78.17 |

FOREIGN PATENT DOCUMENTS

| | | |
|---|---|---|
| 1493327 | 11/1969 | (DE) . |
| 1795389 | 1/1972 | (DE) . |
| 0342830 | 11/1989 | (EP) . |
| 0441530 | 8/1991 | (EP) . |
| 0692567 | 1/1996 | (EP) . |
| 94/14875 | 7/1994 | (WO) . |

* cited by examiner

Primary Examiner—Robert Dawson
Assistant Examiner—Jeffrey B. Robertson
(74) Attorney, Agent, or Firm—Oblon, Spivak, McClelland, Maier & Neustadt, P.C.

(57) ABSTRACT

Water-soluble, i.e. easily dispersible, amino-functional polyorganosiloxanes obtained by radical polymerization of vinyl compounds containing amino or ammonium groups onto polyorganosiloxanes which contain at least one mercapto group. They are suitable as textile finishing aids, surfactants and emulsifiers.

21 Claims, No Drawings

AMINO-FUNCTIONAL POLYORGANOSILOXANES, THEIR PRODUCTION AND USE

BACKGROUND OF THE INVENTION

1. Field of the Invention

The invention relates to new water-soluble, i.e. easily dispersible, amino-functional polyorganosiloxanes, which are obtained by radical polymerization of vinyl compounds containing amino or ammonium groups onto polyorganosiloxanes which contain at least one mercapto group, and which can be used as textile finishing aids.

2. Background of the Invention

From the literature, polyorganosiloxanes containing amino or ammonium groups have been known for a long time, and the most varied methods for their production have been described. As an example, reference will be made here to the synthesis of organopolysiloxanes containing tertiary amino groups as described by E. L. Morehouse in DE-OS 14 93 327, in which the desired compounds are obtained by hydrosilylation of methyl hydrogen siloxane.

As is known, for example, from U.S. Pat. No. 4,098,701, polysiloxanes which carry amino groups are suitable for finishing fiber material, in order to give such material the desired properties, such as a soft, smooth feel and wrinkle resistance. Therefore, these compounds are usually used as textile finishing aids.

In U.S. Pat. No. 4,098,701, polyorganosiloxanes which contain the grouping —$(CH_2)_3NHCH_2CH_2NH_2$ as the amino-functional group are described. This grouping, however, causes a strong tendency toward thermal yellowing, a discoloration which is reinforced by elevated temperatures. To eliminate this problem, organopolysiloxanes which contain nitrogen, with side chains which do not contain any primary amino groups, were proposed in EP-A 0 692 567, for example. Furthermore, in EP-A 0 441 530, replacement of the amino ethylaminopropyl group with the N-methyl piperazino group was recommended, or, in EP-A 0 342 830, reaction of siloxanes containing amino ethylaminopropyl groups with butyrolactone was recommended.

The synthesis of modified siloxanes, for example by grafting ethylene-unsaturated compounds, such as styrene or methyl methacrylate, onto polydimethyl siloxanes containing mercapto groups (among others, DE 17 95 389 and U.S. Pat. No. 4,071,577) has been known for a long time. WO 94/14875 describes the synthesis of graft polymers on the basis of perfluoroalkyl acrylates and mercaptosiloxanes and their use as a water-repelling and oil-repelling finish for textiles.

Furthermore, in U.S. Pat. No. 4,985,155, a textile finishing aid on a silicone basis is described which is produced by polymerization of mercaptosiloxanes and alkyl acrylates or methacrylates, where up to thirty percent of the acrylates can be replaced by other acrylic acid derivatives, such as acrylamide or also dimethylaminopropyl acrylate. These products, which are insoluble in water, and demonstrate only low cationogeneity, are particularly suitable for soft coatings on textiles which are supposed to be water-proof and wind-proof, such as sports and ski clothing, raincoats, umbrellas, tents, and convertible tops. A proportion of at least 70 wt.-% of alkyl acrylates or methacrylates, however, is absolutely necessary in order to achieve a soft coating. A proportion below 70 wt.-% would impair the coating in such a way that bonding to the fiber surface is disrupted and satisfactory mechanical properties of the coating film are no longer obtained. In order to obtain an effective coating, a compound with a cross-linking effect (e.g. polyisocyanate) is used for the treatment. The weight proportion of the coating in the total weight of the coated textile is usually at least 20 wt.-%, but in some cases also significantly higher.

In the coating of flat textile structures as mentioned, the fabric to be coated is provided with a continuous layer, as free of pores as possible, of a water-repelling organic coating, in order to achieve not only surface hydrophobization but also penetration resistance to rain and water pressure resistance, for example for rain clothing. In this connection, the coating agent can be applied either on one side, by means of a device such as a ductor roller, or on both sides, for example by means of a foulard. The compounds used for coating can be present both as pastes which contain water, or dissolved in an organic solvent. Bonding of the coating masses to the surface of the textile takes place by means of added organic cross-linking agents, such as isocyanates, compounds which contain methylol groups or compounds which contain epoxy groups. The goal of this process is to structure the coating process in such a way that the greatest possible mechanical strength of the film is achieved, without causing overly great stiffening of the material. This is achieved by means of pre-hydrophobization of the textile to be coated, which prevents overly deep penetration of the coating mass into the woven material and, therefore, adhesion of the fibers to one another.

In high-grade finishing of textiles, significantly smaller amounts of finishing aids are used. Before being used in textile finishing, however, siloxanes first have to be converted into aqueous emulsions, which often requires a significant amount of effort. The usual emulsion processes, such as shear emulsification or emulsification by phase inversion, for the production of usable emulsions, are very complicated in technical terms and always represent a compromise between the stability of the emulsions which is necessary for commercial use and a deterioration of the application technology properties, such as a soft feel or resistance to rubbing of the treated textile substrate. This is caused by the addition of surfactants, co-surfactants or hydrotropics which is necessary for production of the emulsion. Another disadvantage of this form of preparation is the fact the silicone emulsions can be concentrated only up to a certain upper limit, without phase separations taking place or the emulsion solidifying into a paste which can be processed further only with difficulty. These disadvantages have had the result that until now, amino-functional siloxanes have been applied to the textile substrates almost exclusively by means of padding.

A large part of the softeners for textile substrates used in high-grade finishing, however, are applied using the drawing method. In order to be able to use a softener here, it must demonstrate not only great mechanical stability in the liquor, but also good stability with regard to pH deviations, the property of being easily dispersible or self-dispersible, as well as good drawing behavior and substantivity.

The task of the invention now consisted of making available amino-functional polyorganosiloxanes which are water-soluble or easily emulsified or self-emulsifying, and which can be produced economically, particularly using commercially available starting materials. It is supposed to be possible to use the amino-functional polyorganosiloxanes in aqueous formulations, as textile finishing aids or surfactants.

SUMMARY OF THE INVENTION

Surprisingly, it was found that amino-functional polyorganosiloxanes which are very easily emulsified, going so far as to be self-emulsifying, are obtained by graft copolymerization of ethylene-unsaturated monomers containing amino groups onto mercaptosiloxanes, and that these give textiles finished with them an excellent soft feel.

DETAILED DESCRIPTION OF THE INVENTION

The object of the invention is amino-functional polyorganosiloxanes of the general formula (I)

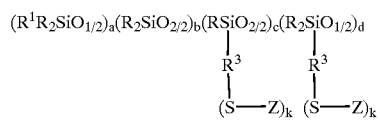

(I)

where $R^1$, independent of one another, stands for either alkyl, aryl, alkoxy or hydroxy radicals, R, independent of one another, stands for the same or different, substituted or unsubstituted alkyl, aryl or alkylaryl radicals, as well as $R^3$, independent of one another, stands for a linear or branched, substituted or unsubstituted alkylene radical, interrupted or not interrupted by hetero groupings, with 2 to 10 carbon atoms, b has a value of from 50 to 1,000, preferably 90 and 800, and c has a value of from 1 to 100, as well as a and d have values, in each instance, from 0 to 2, with the proviso that the sum of (a+d) is a maximum of 2, and that k is either 1 or 2, and Z corresponds to the structure of formula (II)

$$(M1)(M2)(M3)H \quad (II)$$

where (M1) represents a structural unit selected from at least one of (A)

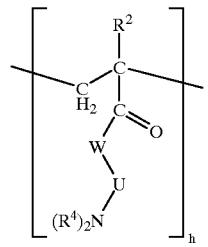

or (B)

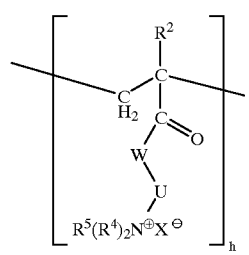

where W represents an $-NR^2-$ or $-O-$ grouping, U represents a linear or branched alkylene group with 2 to 10 carbon atoms, $X^\ominus$ represents a negatively charged ion which is stable in aqueous solution, $R^2$, independent of one another, represents alkyl radicals with 1 to 4 carbon atoms or hydrogen, $R^4$, independent of one another, represents substituted or unsubstituted alkyl, aryl, or alkylaryl radicals with 1 to 10 carbon atoms, and $R^5$, independent of one another, represents substituted or unsubstituted, saturated or unsaturated alkyl, aryl, or alkylaryl radicals with 1 to 10 carbon atoms or hydrogen, and h has a value of between 0 and 250, preferably up to 150, especially preferably up to 100, (M2) represents a structural unit selected from at least one of (C)

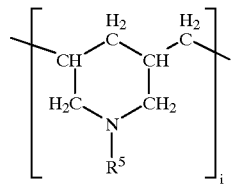

(D)

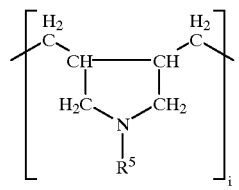

(E)

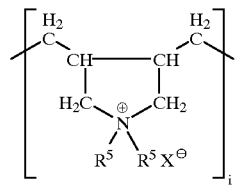

or (F)

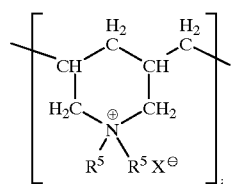

where $R^5$ has the meaning indicated above and i has a value of between 0 and 400, preferably up to 300, especially preferably up to 200, and (M3) represents a structural unit selected from at least one of (G)

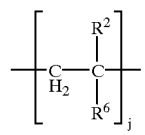

(H)

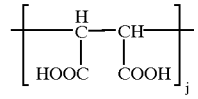

or

-continued

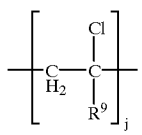
(J)

where R⁶ represents a —COOR⁷— or CONR²—R⁸— grouping, in which R⁷ represents a linear or branched alkyl radical with 1 to 18 carbon atoms, hydroxyalkyl radicals with 2 to 5 carbon atoms, alkoxy polyethylene glycol radicals with molecular weights of 73 to 1,000 g/mole, or a hydroxy group, and R⁸ represents a hydroxy methylene or hydroxy methylene ether radical, a 2-methyl propane sulfonic acid radical or hydrogen, and R⁹ represents hydrogen or chlorine, and j has a value of between 0 and 200, preferably up to 150, especially preferably up to 100, with the proviso that the sum of (h+i) is always greater than (2·j), preferably greater than (2.3·j).

In the compound of the general formula (I), methyl and/or ethyl radicals are preferred as R radicals, and methyl, ethyl, hydroxy, methoxy and/or ethoxy radicals are preferred as the radical R¹. The radical R³ in the general formula (I) should not contain any groups that are easily hydrolyzed, such as ester groupings, and no unsaturated groupings and/or groupings which split off protons. For example, alkylene radicals substituted with hydroxy, halogen, or alkoxy groups, with 1 to 10 carbon atoms, such as propylene, 2-methyl propylene, butylene, decanylene groupings, can be bound as the radical R³.

Furthermore, the radical R³ can be an alkylene radical with 1 to 10 carbon atoms, which is interrupted by one or two hetero groupings selected from among ether, thioether, amino, carboxyl, carbamide and/or sulfonamide groups, an example for this being the

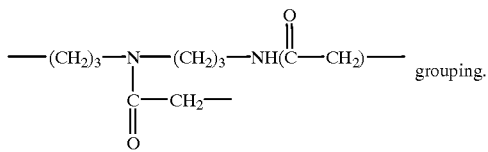
grouping.

The amino-functional polyorganosiloxanes according to the invention can be produced by the reaction of a compound of the general formula (I), where Z stands for hydrogen, which has at least one mercapto group, with the corresponding compounds M1, M2 and M3, which form the structural units (M1), (M2) and/or (M3), in the presence of an initiator. The reaction usually takes place by radical graft polymerization onto the mercapto group.

Usual examples for the compound M1 are amino alkyl acrylates and/or methacrylates, amino alkyl acrylamides and/or amino alkyl methacrylamides and/or their ammonium compounds, for the compound M2, diallyl amines and diallyl ammonium compounds can be used, and for the compound M3, alkyl acrylates, alkyl methacrylates, methylolated acryl and methacryl amides and their alkyl ethers, acrylic acids and methacrylic acids, maleic acid or its anhydride, fumaric acid, itaconic acid, 2-acrylamido-2-methyl propane sulfonic acid, vinyl acetate, vinyl propionate, vinyl chloride and/or vinylidene chloride can be used.

The radical polymerization is usually carried out in the presence of an initiator, where the initiation can take place both via compounds which can be split off thermally, such as azo compounds and/or peroxides, or via compounds which can be split off photolytically, such as benzoines. Furthermore, all the compounds known for this reaction mechanism can be used. In particular, compounds, or mixtures of them, whose photochemical excitation states and/or whose successor products are capable of H abstraction or of addition to double bonds and can therefore trigger radical polymerization can be used as initiators, such as benzoin ethers, benzyl ketals, dibenzoyl peroxides, benzophenones, or hydrodroxy [sic] acetophenone The reaction can be carried out in solution or without a solvent. Solvents which can be used are, among others, alcohols, such as 2-propanol, isopropanol, 1-butanol, 2-butanol, aromatics, esters or ketones. Preferably, the solvent is present in the reaction mixture in an amount of up to 50 wt.-%.

For the reaction temperature, ranges between 40 and 150° C. can be selected if initiators which can split thermally are used, and between −10 and 50° C. in the case of compounds which can split photolytically. The reaction is usually concluded within a time period of 1 to 15 hours, preferably within 3 to 8 hours. The use of pressure or working in a vacuum is possible but not preferred.

Another variant for the production of the amino-functional polyorganosiloxanes according to the invention is the reaction of the compound of the general formula (I), where Z stands for hydrogen, with at least one mercapto group, first with a compound selected from among methyl acrylate, methyl methacrylate, ethyl acrylate and/or ethyl methacrylate, and subsequently with compounds of the general formula H₂N—U—N(R⁴)₂, where R⁴ as well as U have the meaning indicated above. In this connection, the reaction in the first step takes place by radical polymerization as described above, and in the second step by aminolysis. With reference to the general formula (I), the amino-functional polyorganosiloxanes obtained do not contain the structural units (M2) and (M3), i.e. i and j are 0.

Reactions of the monomers with and among each other which might take place are possible, but do not deleteriously affect the production and also the later use of the amino-functional polyorganosiloxanes according to the invention.

The mercaptosiloxanes of the general formula (III)

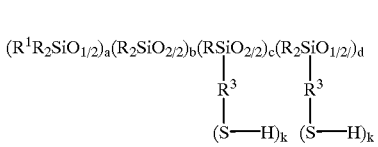
(III)

used as starting substances for the production of the polyorganosiloxanes according to the invention, where all the radicals and subscripts have the meaning as indicated above, as well as their production are known. For example, it is possible to synthesize them by reaction of mercaptopropyl dimethoxymethyl silane with a dihydroxyoligodimethylsiloxane or by co-equilibration of siloxane cycles containing mercaptopropyl with trimethyl siloxy-terminated polydimethyl siloxanes, or also by the reaction of commercially available siloxanes containing amino or epoxy groups to produce mercaptosiloxanes.

As examples, two reactions for the production of the mercapto-functional siloxanes are shown below:

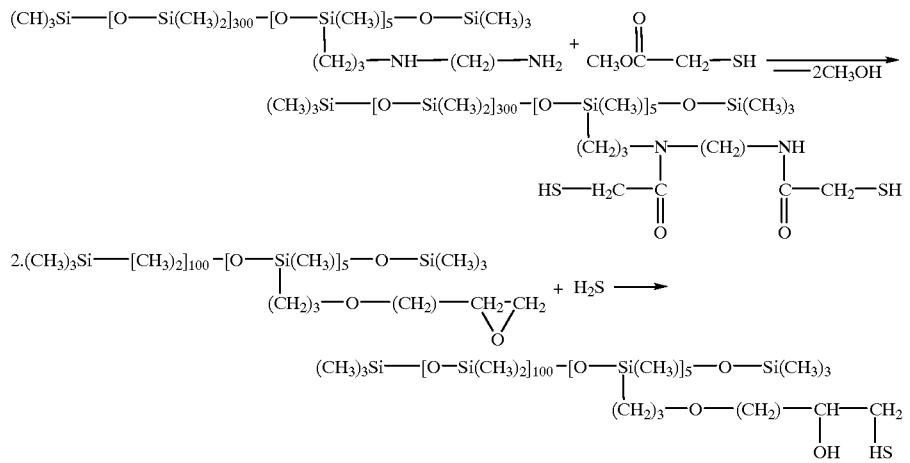

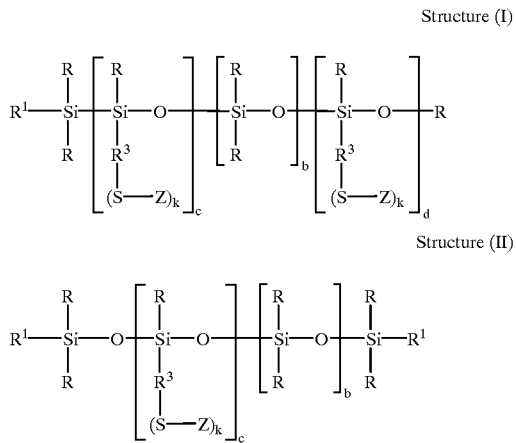

The compounds according to the invention can have the following structures encompassed by general formula (I):

Structure (I)

Structure (II)

However, it is also easily possible to synthesize compounds according to the invention which contain amino-functional Z groupings both in the end positions and in the side positions.

Use of the amino-functional polyorganosiloxanes preferably takes place in the form of aqueous formulations, for example as emulsions, which can be produced according to known methods.

Areas of application for the compounds according to the invention are, among others as textile finishing aids or as surfactants for lowering the surface tension of a material, such as an emulsifier. Furthermore, they can also be used as building protection agents, as additives for water-based paint systems, and in body care, for example as conditioners in shampoos.

Because of their cationogencity, which is a result of the number of amino groups in the molecule, the amino-functional polyorganosiloxanes according to the invention adhere very well to substrates such as textiles, for example to cotton, polyester, or polyamide. The textiles finished with them are breathable, water-permeable and resistant to rubbing, and have a clearly softer feel than those compounds which demonstrate a high proportion of acrylate groups and a lower cationogeneity.

Because of the copolymerization of monomers demonstrating other functionalities, properties such as washing permanence can be positively influenced in the siloxanes according to the invention.

PREFERRED EMBODIMENTS OF THE INVENTION

I. Production of the Mercapto-functional Siloxanes Used

EXAMPLE S1

125 g mercaptopropyl dimethoxymethyl silane (DYNASYLAN 3403, Sivento Chemie GmbH) were weighed into the 4 liter three-neck flask with 3,000 g of a hydroxy-terminated organopolysiloxane with an average composition $HO(Si(CH_3)_2O)_{23}H$ and 0.5 g sulfric acid (98%), made inert with nitrogen and heated to 140° C. while stirring. After a reaction time of five hours, a Liebig cooler was put into place and 100 g equilibrium cycles were distilled off at a pressure of 780 mbar. The silicone oil obtained in this way was slightly cloudy and had a viscosity of 4,000 mPas.

EXAMPLE S2

85 g of a mixture of $[O-Si(CH_3)(CH_2CH_2CH_2SH)]_n$ with n=3 to 5, 2,500 g of a trimethylsilyl end blocked polydimethyl siloxane with a viscosity of 1,000 mPas, and 30 g Tonsil catalyst were placed in a 4 liter three-neck flask, and kept at 90° C. under a nitrogen atmosphere for 20 hours. The product obtained in this way was filtered, and a clear oil with a viscosity of 500 mPas was obtained.

EXAMPLE S3

In a 0.25 liter three-neck flask, equipped with a stirrer, gas introduction pipe and gas exhaust line, hydrogen sulfide was introduced, while stirring, into a mixture of 0.1 g diazobicyclooctane and 200 g of a trimethylsilyl end-blocked, glycidyl ether modified polydimethyl siloxane (epoxy content: 0.31 mmol epoxy groups/g siloxane; viscosity at 25° C. 300 mPas), over a period of two hours, at 20° C. In the highly viscous reaction product, the two signals at 50.4 ppm and 43.5 ppm had disappeared in the $^{13}C$-NMR spectrum, and new signals had occurred at 30.1 ppm and 76.2 ppm.

EXAMPLE S4

In a 1 liter three-neck flask, equipped with a stirrer, thermometer, and a reflux cooler, a mixture of 100 g m-xylene, 500 g of a polydimethyl siloxane modified with aminoethyl aminopropyl groups (viscosity at 25° C.; 534 mPas; 0.68 wt.-% nitrogen, trimethylsilyl end-blocked) and 35 g thioglycolic acid methyl ester was boiled under a nitrogen atmosphere for eight hours, with reflux, at 150° C. Subsequently, the reaction mixture was evaporated at 150° C. and p=50 mbar for two hours. In the highly viscous siloxane with a strong yellow color which was obtained in this way, no amino groups could be detected any longer.

EXAMPLE S5

76 g of the compound $HS(CH_2)_3Si(CH_2)_2OSi(CH_2)_3(CH_2)_2SH$, 2,350 g of a mixture of hexamethyl trisiloxane and octamethyl tetrasiloxane and 25 g Tonsil catalyst were placed in a 4 liter three-neck flask, and kept at 90° C. under a nitrogen atmosphere for 20 hours. The product obtained in this way was filtered and evaporated at 150° C. for two hours. A clear oil with a viscosity of 500 mPas at 25 ° C. was obtained.

EXAMPLE S6

15 g or the compound $HS(CH_2)_3Si(CH_3)_2OSi(CH_3)_3(CH_2)_2SH$, 55 g of a mixture of $[O-Si(CH_3)(CH_2CH_2CH_2SH)]_n$ with n=3 to 5, 2,300 g of a mixture of hexamethyl trisiloxane and octamethyl tetrasyloxane and 25 g Tonsil catalyst were placed in a 4 liter three-neck flask, and kept at 90° C. under a nitrogen atmosphere for 20 hours. The product obtained in this way was filtered and evaporated at 150° C. for two hours. A clear oil with a viscosity of 1,900 mPas at 25° C. was obtained.

II. Production of the Amino-functional Polyorganosiloxanes
General Process Variants
Variant A The mercapto-functional siloxane was mixed with the monomer, the solvent, and the initiator in a 250 ml three-neck flask, under a nitrogen atmosphere, and kept at the temperature indicated for eight hours, while stirring. 100 g of the product were mixed with 1,000 g of an aqueous acetic acid solution (3 wt.-%) and 100 g volatiles were distilled off at 90° C., under reduced pressure.
Variant B The mercapto-functional siloxane was mixed with the non-ionic monomer, the solvent, and the initiator in a 250 ml three-neck flask, under a nitrogen atmosphere, and kept at the temperature indicated for eight hours, while stirring. After one hour, the ionic monomer was added. 100 g of the product obtained were mixed with 1,000 g of an aqueous acetic acid solution (3 wt.-%) and 100 g volatiles were distilled off at 90° C., under reduced pressure.
Variant C The mercapto-functional siloxane was mixed with the monomer, the solvent, and the initiator in a 250 ml three-neck flask, under a nitrogen atmosphere, and kept at the temperature indicated for eight hours, while stirring. 100 g of the product were mixed with 1,400 g of an aqueous acetic acid solution (3 wt.-%) and 400 g volatiles were distilled off at 90° C., under reduced pressure.
Variant D 10 wt.-% of the mercapto-functional siloxane, the monomers, the solvent, and the initiator were mixed in a 250 ml three-neck flask, under a nitrogen atmosphere, and the mixture was kept at the temperature indicated for a total of eight hours, while stirring. Starting after one hour of reaction time, the remaining 90 wt.-% of the mercapto-functional siloxane were uniformly dripped in over five hours. 100 g of the product were mixed with 1,000 g of an aqueous acetic acid solution (3 wt.-%) and 100 g volatiles were distilled off at 90° C. under reduced pressure.

Process Examples V1 to V21 as Well as
Comparison Examples Vgl. 1 and Vgl. 2

These examples were summarized in the form of a table (Table 1), which contains the substances used, the variant according to which production took place in each instance, as well as the appearance of the product.

Process Example V22

100 g of the product from Example S2 were heated with 50 g methyl acrylate, 0.3 g azobis(isobutyronitrile) and 200 g o-xylene in a 1 liter three-neck flask, equipped with a stirrer, reflux cooler, and thermometer, and subsequently heated to 70° C. while stirring. Several minutes after the reaction temperature is reached, a clearly exothermic reaction is found, which must be countered by cooling the mixture. After seven hours of reaction time, a clear, colorless product is obtained, which has, however, become clearly more viscous than the starting mixture. 100 g 3-dimethylamino-1-propylamine are added to this intermediate product, and the mixture is heated at the boiling point at 150° C. for twenty hours. Afterwards, a sample of the mixture is taken and a titratable aminonitrogen proportion of 4.7 wt.-% is determined (corresponds to a degree of conversion of 74%). The reflux cooler is replaced with a distillation cooler and the xylene as well as excess amine are distilled off at 150° C., under reduced pressure. After the distillation was terminated, a viscous, yellow paste was obtained. 100 g of this paste were mixed with 900 g of an aqueous acetic acid solution (3 wt.-%). After one hour of stirring, a translucent emulsion with a yellowish color was obtained.

Process Example V23

30 g dimethylaminopropyl acetate, 100 g mercaptosiloxane from Example S2, 50 g 2-propanol, and 1.8 g dibenzoyl peroxide were weighed into a reactor with an immersion burner made of quartz glass, constantly mixed by means of a nitrogen stream, and cooled with a thermostat to 5° C. After 4 hours of irradiation with a 125 W mercury vapor pressure radiator, a product was obtained which is soluble in an aqueous acetic acid solution (3 wt.-%), producing a clear solution.

III. Production of Emulsions
Emulsion E1

100 g of the polymerization product from process example V5 were mixed with 5 g acetic acid (100 wt.-%), and 150 g demineralized water were added while stirring. 150 g water/solvent mixture of this solution were distilled off in a vacuum at 80° C. The emulsion obtained in this way was clear and easily diluted with water.

Comparison Example Vgl.3

15 g siloxane with trimethylsilyl end groups and aminoethyl aminopropyl side chains (0.65 wt.-% nitrogen; viscosity at 25° C.: 2,100 mPas) were stirred with 10 g of an isotridecyl polyethylene glycol with an average of seven ethylene oxide units, 1 g acetic acid (100 wt.-%), and 15 g isopropanol, until a clear mixture was obtained. Subsequently, a total of 69.5 g water were added to the mixture in small portions, while stirring. A clear to slightly bluish microemulsion was obtained.

IV. Finishing of Textiles (Application Examples)

IV a) Foulard Process—Examples A1 to A10

The following were used:

a bleached, non-finished cotton terry fabric with 400 g/m² for the determination of soft feel and water penetration time, and a red cotton woven fabric with 120 g/m² for the determination of rubbing resistance and the dry wrinkle recovery angle.

The materials were saturated with the liquor in each instance, squeezed off with a two-roller foulard, to a liquor absorption of 80%, and dried at 120° C. for 10 minutes. Subsequently, the finished fabric was allowed to lie out at room temperature for at least eight hours.

Table 2 summarizes the products used and the results of the fabric finished using the Foulard process, for examples A1 to A10.

IV b) Drawing Process—Examples A11 to A13

A bleached, non-finished cotton terry fabric with 400 g/m² was used. This was dipped into the liquor in each instance (liquor ratio 120), left at 20° C. for 20 minutes, then taken out and subsequently dried at 120° C. for 10 minutes and then laid out at room temperature for at least eight hours.

The following results were obtained:

| | Product from Example | Product amount, with reference to weight of terry material in wt.-% | Soft feel (assessment of feel) |
|---|---|---|---|
| Example A11 | V1 | 7.0 | 3 |
| Example A12 | Vg1.1 | 7.2 | 1 |
| Example A13 | Vg1.3 | 2.0 | 2 |

V. Determination Methods for the Results of the Application Examples Determination of Soft Feel (Assessment of Feel)

Since the soft feel of textiles is very much dependent on the subject to the subjective sensations of the test person, only a standardization of the general conditions can be achieved, not a standardization of the assessment. In order to guarantee reproducibility nevertheless, the finished samples were assessed with regard to their soft feel and ranked. For this purpose, 1 to n points were assigned to the tested samples by ten persons, as a function of the number n of tested samples, with n points being given for the softest sample and 1 for the least soft sample. The tables show the average values of the points given to the individual samples in each instance.

Determination of Water Penetration

The finished sample was left in room air humidity for acclimatization, for at least eight hours, then a drop of de-ionized water was placed on it and the time until the drop of water was absorbed by the fabric was determined, but no longer than three minutes. Five determinations were made, and the average was found.

Determination of Rubbing Resistance

The determinations were conducted in accordance with the standard EN ISO 105-XI2 and 105-A03, using a red cotton woven fabric.

Determination of Liquor Stability

In order to test the stability of organopolysiloxane emulsions against alkalis in the finishing liquor, the following test was conducted:

The liquors were mixed in a 1000 ml beaker, in accordance with the formulation indicated, and adjusted to a pH of 10 using sodium hydroxide solution (10 wt.-%). Subsequently, the liquor was stirred with a vane stirrer at 2000 rpm for twenty minutes. After this time had elapsed, the stirrer was shut off, the foam was allowed to dissipate, and the surface of the liquid was observed for precipitates after another fifteen minutes.

Assessment:

1 no precipitates or clouding 2 clouding of the liquor increased 3 oil film visible on the surface 4 oil drops and precipitates are visible For the emulsions which demonstrate precipitates or an oil film, there is the risk, in textile finishing, that if alkalis are entrained into the finishing liquor, the emulsion will be destroyed and that this will result in deposits on the rollers and spots on the fabric.

This application is based on German Application No. DE 19802 069.4, filed Jan. 21, 1998, and incorporated herein by reference in its entirety.

TABLE 1

Production of the amino-functional polyorganosiloxanes

| | Substances used | V1 | V2 | V3 | V4 | V5 | V6 | V7 | V8 | V9 | V10 | V11 | V12 | V13 |
|---|---|---|---|---|---|---|---|---|---|---|---|---|---|---|
| S1 | Mercaptosiloxane from Example 1 | 100 | | 100 | | | | | | | | | | |
| S2 | Mercaptosiloxane from Example 2 | | 100 | | 100 | 100 | 100 | 100 | 100 | 100 | | | | |
| S3 | Mercaptosiloxane from Example 3 | | | | | | | | | | 100 | | 100 | |
| S4 | Mercaptosiloxane from Example 4 | | | | | | | | | | | 100 | | |
| S5 | Alpha-omega mercapto | | | | | | | | | | | | | 100 |
| M1 | N,N-dimethylaminopropyl acrylamide | 30 | | | | | | | 25 | 25 | 25 | 25 | 25 | 25 |
| M1 | N,N-dimethylaminopropyl methacrylamide | | 30 | | | | | 15 | | | | | | |
| M1 | N,N-dimethylaminoethyl methacrylate | | | 30 | | | | | | | | | | |
| M1 | N-tert. butylaminoethyl methacrylate | | | | 30 | | | | | | | | | |
| M1 | N,N-dimethylaminoethyl acrylate | | | | | 30 | | | | | | | | |
| M1 | N,N,N-trimethylammonium propyl acrylamide (50% solution in water) | | | | | | | | | | 5 | | | |
| M1 | N,N,N-trimethylammonium propyl methacrylamide (50% solution in water) | | | | | | | | | | | 5 | | |
| M1 | N,N-N,trimethylammonium ethyl methacrylamide (50% solution in water) | | | | | | | | | | | | 5 | |
| M1 | N,N-dimethyl-N-benzylammonium methyl | | | | | | | | | | | | | 15 |

TABLE 1-continued

Production of the amino-functional polyorganosiloxanes

|   |   |   |   |   |   |   |   |   |   |   |   |   |   |   |
|---|---|---|---|---|---|---|---|---|---|---|---|---|---|---|
|   | methacrylate (50% solution in water) |   |   |   |   |   |   |   |   |   |   |   |   |   |
| M2 | Diallyl amine |   |   |   |   | 40 | 15 |   |   |   |   |   |   |   |
| M2 | Diallyl dimethylammonium chloride (50% solution in water) |   |   |   |   |   |   |   |   |   |   |   | 5 |   |
| I | 2,2'-azobis(isobutyronitrile) |   |   |   |   | 0.5 | 0.4 | 0.3 | 0.3 | 0.3 | 0.3 |   |   |   |
| I | 2,2'-azobis(2,4-dimethyl valeronitrile) |   | 0.3 | 0.2 | 0.2 | 0.3 |   |   |   |   |   |   | 0.3 |   |
| I | 2,2'-azobis(2-methyl butyronitrile) | 0.2 |   |   |   |   |   |   |   |   |   |   |   |   |
| I | Dibenzoyl peroxide |   |   |   |   |   |   |   |   |   |   |   |   | 0.3 |
| L | Isopropanol |   |   |   |   | 100 |   | 70 | 55 | 100 | 100 | 86 |   |   |
| L | Toluene |   |   | 100 |   |   | 100 |   |   |   |   |   |   | 100 |
| L | Acetic acid isopropyl ester | 100 |   |   |   |   |   |   |   |   |   |   |   |   |
| L | 2-butanone |   |   |   | 100 |   |   |   |   |   |   |   |   |   |
|   | Reaction temperature in ° C. | 67 | 60 | 60 | 57 | 57 | 62 | 65 | 67 | 67 | 65 | 65 | 66 | 78 |
|   | Process variant | C | A | D | C | A | A | C | B | B | B | B | B | C |
|   | Appearance of the product | b | a | b | a | a | c | a | a | a | a | a | a | b |

|   |   | Examples |   |   |   |   |   |   |   |   |   |
|---|---|---|---|---|---|---|---|---|---|---|---|
|   | Substances used | V14 | V15 | V16 | V17 | V18 | V19 | V20 | V21 | Vgl.1 | Vgl.2 |
| S1 | Mercaptosiloxane from Example 1 |   |   | 100 |   |   |   |   |   |   |   |
| S2 | Mercaptosiloxane from Example 2 |   | 100 |   | 100 | 100 | 100 | 100 | 100 | 100 | 100 |
| S6 | Alpha-omega mercapto TMS | 100 |   |   |   |   |   |   |   |   |   |
| M1 | N,N-dimethylaminopropyl acrylamide | 20 |   | 15 |   |   |   |   |   |   |   |
| M1 | N,N-dimethylaminopropyl methacrylamide |   | 20 |   | 25 | 20 |   | 30 | 21 |   |   |
| M1 | N,N-dimethylaminoethyl acrylate |   |   |   |   |   | 22 |   |   |   | 7.5 |
| M2 | Diallyl dimethylammonium chloride (50% solution in water) |   |   |   |   |   |   | 3 |   |   |   |
| M3 | n-butyl acrylate | 10 |   |   |   |   |   |   |   | 15 | 30 |
| M3 | 2-ethyl hexyl methacrylate |   | 5 |   |   |   |   |   |   | 15 |   |
| M3 | Methoxy polyethylene glycol-350 methacrylate |   |   | 15 |   |   |   |   |   |   |   |
| M3 | Acrylamide | 3 |   |   |   |   |   |   |   |   |   |
| M3 | N-butoxy methyl methacrylamide |   |   |   | 3 |   |   |   |   |   |   |
| M3 | Vinyl acetate |   |   |   |   | 5 |   |   |   |   |   |
| M3 | Methacrylic acid |   |   |   |   |   |   | 6 |   |   |   |
| M3 | Vinylidene chloride |   |   |   |   |   | 7 |   |   |   |   |
| M3 | 2-acrylamido-2-methyl propane sulfonic acid |   |   |   |   |   |   |   | 4 |   |   |
| I | 2,2'-azobis(isobutyronitrile) |   |   |   | 0.4 | 0.4 |   |   |   |   |   |
| I | 2,2'-azobis(2,4-dimethyl valeronitrile) (Wako V-65) | 0.2 | 0.3 | 0.3 |   |   | 0.3 | 0.3 | 0.3 | 0.3 | 0.3 |
| I | Dibenzoyl peroxide |   |   |   |   |   |   |   |   |   |   |
| L | Isopropanol |   | 50 | 70 | 15 |   |   | 100 | 100 |   |   |
| L | Toluene |   |   |   |   |   |   |   |   | 100 | 100 |
| L | 2-butanone |   |   |   |   |   |   |   |   |   |   |
|   | Reaction temperature in ° C. | 58 | 60 | 60 | 65 | 65 | 66 | 57 | 57 | 57 | 57 |
|   | Process variant | A | A | A | A | A | A | B | A | C | C |
|   | Appearance of the product | c | c | a | a | a | b | a | a | c | d |

I = initiator
L = solvent
a - clear mixture
b - bluish shimmering to slightly cloudy emulsion
c - white emulsion
d - no emulsion, mixture separated into oil and water layer

TABLE 2

Application Examples

|   | Examples |   |   |   |   |   |   |   |   |   |
|---|---|---|---|---|---|---|---|---|---|---|
| Substances used | A1 | A2 | A3 | A4 | A5 | A6 | A7 | A8 | A9 | A10 |
| Product from Example V1 | 35 |   |   |   |   |   |   |   |   |   |
| Product from Example V2 |   | 20 |   |   |   |   |   |   |   |   |
| Product from Example V6 |   |   | 21 |   |   |   |   |   |   |   |
| Product from Example V7 |   |   |   | 35 |   |   |   |   |   |   |
| Product from Example V9 |   |   |   |   | 32 |   |   |   |   |   |
| Product from Example V14 |   |   |   |   |   | 20 |   |   |   |   |
| Product from Example V20 |   |   |   |   |   |   | 36 |   |   |   |
| Product from Example V21 |   |   |   |   |   |   |   | 34 |   |   |
| Product from Example Vgl.1 |   |   |   |   |   |   |   |   | 36 |   |
| Product from Example Vgl.3 [sic] |   |   |   |   |   |   |   |   |   | 10 |
| Acetic acid 100% | 0.5 | 0.5 | 0.5 | 0.5 | 0.5 | 0.5 | 0.5 | 0.5 | 0.5 | 0.5 |
| Water, de-ionized | 465 | 480 | 478 | 465 | 467 | 480 | 464 | 466 | 464 | 490 |
| Soft feel | 7.2 | 7.1 | 7.1 | 6.7 | 5.9 | 3.8 | 4.9 | 4.2 | 1 | 7.1 |
| Water penetration time according to TEGEWA drop | 127 | >180 | >180 | 98 | >180 | 87 | 52 | 34 | >180 | >180 |

TABLE 2-continued

Application Examples

| Substances used | Examples | | | | | | | | | |
|---|---|---|---|---|---|---|---|---|---|---|
| | A1 | A2 | A3 | A4 | A5 | A6 | A7 | A8 | A9 | A10 |
| test in sec | | | | | | | | | | |
| Wrinkle recovery angle according to DIN 53890 | 115 | 118 | 121 | 116 | 123 | 112 | 118 | 116 | 128 | 126 |
| Dry rubbing resistance according to EN ISO 105-X12 | 5 | 5 | 5 | 5 | 5 | 5 | 5 | 5 | 5 | 4 |
| Wet rubbing resistnace according to EN ISO 105-X12 | 4 | 4 | 4 | 4 | 4 | 4 | 4 | 4 | 4 | 2 |
| Liquor stability at pH 10 | 1 | 1 | 1 | 1 | 1 | 2 | 1 | 1 | 3 | 4 |

Finishing examples on the foulard: all information concerning liquor composition in grams

What is claimed is:

1. Amino-functional polyorganosiloxanes of the general formula (I)

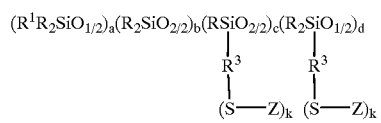

where $R^1$, independent of one another, stands for either alkyl, aryl, alkoxy or hydroxy radicals, R, independent of one another, stands for the same or different, substituted or unsubstituted alkyl, aryl or alkylaryl radicals, $R^3$, independent of one another, stands for a linear or branched, substituted or unsubstituted alkylene radical, interrupted or not interrupted by hetero groupings, with 2 to 10 carbon atoms, b has a value of from 50 to 1,000 and c has a value of from 1 to 100, a and d have values, in each instance, from 0 to 2, with the proviso that the sum of (a+d) is a maximum of 2, and that k is either 1 or 2, and Z corresponds to the structure of formula (II)

$$(M1)(M2)(M3)H \quad \text{(II)}$$

where (M1) represents a structural unit selected from (A)

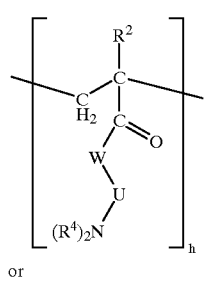

or (B)

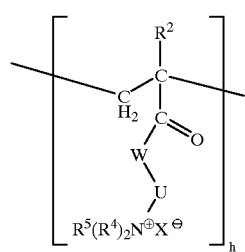

or mixtures thereof, where W represents an —$NR^2$— or —O— grouping, U represents a linear or branched alkylene group with 2 to 10 carbon atoms, $X^{\ominus}$ represents a negatively charged ion which is stable in aqueous solution, $R^2$, independent of one another, represents alkyl radicals with 1 to 4 carbon atoms or hydrogen, $R^4$, independent of one another, represents substituted or unsubstituted alkyl, aryl, or alkylaryl radicals with 1 to 10 carbon atoms, and $R^5$, independent of one another, represents substituted or unsubstituted, saturated or unsaturated alkyl, aryl, or alkylaryl radicals with 1 to 10 carbon atoms or hydrogen, and h has a value of between 0 and 250, (M2) represents a structural unit selected from at least one of (C)

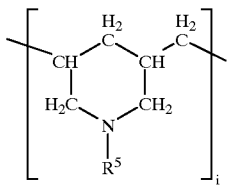

(D)

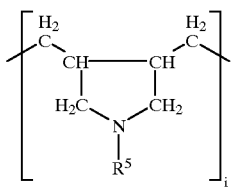

(E)

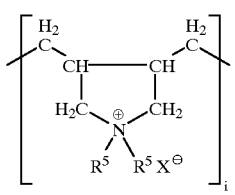

or (F)

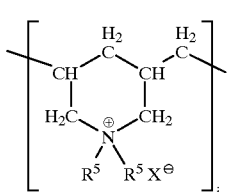

where $R^5$ has the meaning indicated above and i has a value of between 0 and 400, and (M3) represents a structural unit selected from at least one of

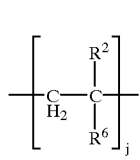 (G)

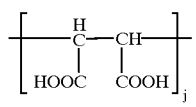 (H)

or

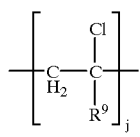 (J)

where $R^6$ represents —COOR$^7$— or CONR$^2$—R$^8$—, ethylene or phenyl grouping, where $R^7$ represents a linear or branched alkyl radical with 1 to 18 carbon atoms, hydroxyalkyl radical with 2 to 5 carbon atoms, alkoxy polyethylene glycol radicals with molecular weights of 73 to 1,000 g/mole, or a hydroxy group, and $R^8$ represents a hydroxy methylene or hydroxy methylene ether radical, a 2-methyl propane sulfonic acid radical or hydrogen, and $R^9$ represents hydrogen or chlorine, and j has a value between 0 and 200, with the proviso that the sum of (h+i) is always greater than (2·j).

2. Amino-functional polyorganosiloxanes according to claim 1, characterized in that the R radical in the compound of the general formula (I) is a methyl and/or ethyl radical.

3. Amino-functional polyorganosiloxanes according to claim 1, characterized in that the $R^1$ radical in the compound of the general formula (I) is a methyl, ethyl, hydroxy, methoxy and/or ethoxy radical.

4. Amino-functional polyorganosiloxanes according to claim 1, characterized in that the $R^3$ radical in the compound of the general formula (I) represents an alkylene radical substituted with hydroxy, halogen, or alkoxy groups, with 1 to 10 carbon atoms.

5. Amino-functional polyorganosiloxanes according to claim 1, characterized in that the $R^3$ radical in the compound of the general formula (I) is an alkylene radical with 1 to 10 carbon atoms, which is interrupted by hetero groupings selected from among ether, thioether, amino, carboxyl, carbamide and/or sulfonimide groups.

6. Amino-functional polyorganosiloxanes according to claim 1, characterized in that the alkylene radical $R^3$ in the general formula (I) is interrupted by one or two hetero groupings.

7. Amino-functional polyorganosiloxanes according to claim 1, characterized in that the $R^3$ radical in the compound of the general formula (I) does not contain any easily hydrolyzed or any unsaturated groupings, and/or any groupings which split off protons.

8. Amino-functional polyorganosiloxanes according to claim 1, characterized in that the $R^3$ radical in the compound of the general formula (1) stands for a propylene, 2-methyl propylene, butylene, decanyl grouping and/or a

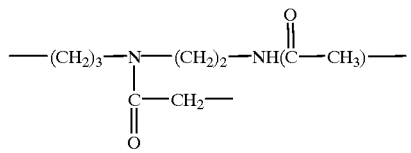

9. Amino-functional polyorganosiloxanes according to claim 1, characterized in that in the compound of the general formula (I), b has a value of between 90 and 800.

10. Process for the production of the amino-functional polyorganosiloxanes according to claim 1, comprising reacting a compound of the general formula (I), where Z stands for hydrogen, which has at least one mercapto group, with corresponding precursor compounds (M1), M2 and M3, which form the structural units (M1), (M2) and/or (M3), respectively in the presence of an initiator.

11. Process for the production of the amino-functional polyorganosiloxanes according to claim 10, wherein the compound M1 is selected from among amino alkyl acrylates and/or methacrylates, amino alkyl acrylamides and/or amino alkyl methacrylamides and/or their ammonium compounds.

12. Process for the production of the amino-functional polyorganosiloxanes according to claim 10, wherein the compound M2 is selected from among diallyl amines and diallyl ammonium compounds.

13. Process for the production of the amino-functional polyorganosiloxanes according to claim 10, wherein the compound M3 is selected from among alkyl acrylates, alkyl methacrylates, methylolated acryl and methacryl amides and their alkyl ethers, acrylic acids and methacrylic acids, maleic acid and its anhydride, fumaric acid, itaconic acid, 2-acrylamido-2-methyl propane sulfonic acid, vinyl acetate, vinyl propionate, vinyl chloride and/or vinylidene chloride.

14. Process for the production of the amino-functional polyorganosiloxanes according to claim 10, wherein the initiator is an azo compound which can be split off thermally and/or a peroxide.

15. Process for the production of the amino-functional polyorganosiloxanes according to claim 10, wherein the initiator is a benzoine which can be split off photolytically.

16. Process for the production of the amino-functional polyorganosiloxanes according to claim 1, wherein the compound of the general formula (I) wherein Z stands for hydrogen, having at least one mercapto group, first is reacted with a compound selected from methyl acrylate, methyl methacrylate, ethyl acrylate and/or ethyl methacrylate, and subsequently is reacted with a compound of the general formula $H_2N$—U—$N(R^4)_2$, where $R^4$ and U have the meanings defined in claim 1.

17. An aqueous formulation of the amino-functional polyorganosiloxanes according to claim 1.

18. The aqueous formulation according to claim 17, in the form of an emulsion.

19. A method for finishing textiles, comprising applying to said textile an amino-functional polyorganosiloxane according to claim 1.

20. A method for lowering the surface tension of a material, comprising contacting said material with an amino-functional polyorganopolysiloxane according to claim 1 as a surfactant.

21. A method for emulsifying a material, comprising contacting said material with an amino-functional polyorganopolysiloxane according to claim 1 as an emulsifier.

* * * * *